United States Patent
Bühle et al.

(10) Patent No.: US 10,293,814 B2
(45) Date of Patent: May 21, 2019

(54) METHOD AND CONTROL UNIT FOR A MOTOR VEHICLE

(71) Applicant: ZF Friedrichshafen AG, Friedrichshafen (DE)

(72) Inventors: Felix Bühle, Eriskirch (DE); Thomas Lemp, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/002,529

(22) Filed: Jun. 7, 2018

(65) Prior Publication Data

US 2018/0354498 A1 Dec. 13, 2018

(30) Foreign Application Priority Data

Jun. 8, 2017 (DE) .......................... 10 2017 209 653

(51) Int. Cl.
*B60W 20/40* (2016.01)
*B60K 6/387* (2007.10)
*F16D 48/06* (2006.01)
*F16H 61/14* (2006.01)

(52) U.S. Cl.
CPC ............. *B60W 20/40* (2013.01); *B60K 6/387* (2013.01); *F16D 48/06* (2013.01); *F16H 61/143* (2013.01); *B60Y 2200/92* (2013.01); *F16D 2500/1045* (2013.01); *F16D 2500/10412* (2013.01); *F16D 2500/3067* (2013.01);
(Continued)

(58) Field of Classification Search
CPC ........ B60W 20/40; B60K 6/387; F16D 48/06; F16H 1/143

USPC .......................................................... 701/22
See application file for complete search history.

(56) References Cited

U.S. PATENT DOCUMENTS

| 5,890,992 A * | 4/1999 | Salecker | ............ B60K 28/165 477/86 |
| 6,113,517 A * | 9/2000 | Salecker | ............ F16D 48/066 477/174 |
| 7,744,502 B2 | 6/2010 | Dreibholz et al. | |

(Continued)

FOREIGN PATENT DOCUMENTS

DE 102006018058 A1 11/2007
DE 102015208402 A1 11/2016

OTHER PUBLICATIONS

German Search Report DE102017209653.5 dated Feb. 20, 2018. (12 pages).

*Primary Examiner* — Yazan A Soofi
(74) *Attorney, Agent, or Firm* — Dority & Manning, P.A.

(57) ABSTRACT

A method for operating a motor vehicle originates from a condition in which a torque converter lockup clutch (6) or a master clutch (13) is engaged and the transmission (2) is friction-locking. The torque converter lockup clutch (6) or the master clutch (13) is then brought into a slip condition on a control side, and a prime-mover rotational speed is decoupled from a driven-end rotational speed. The torque converter lockup clutch (6) or the master clutch (13) is brought into the slip condition without reducing a pressure control of the torque converter lockup clutch (6) or the master clutch (13) and by specifying a target rotational speed or a target torque for the prime mover (1) such that a torque or a target torque is greater than a power transmission capacity of the torque converter lockup clutch (6) or the master clutch (13) and slip is built up.

12 Claims, 3 Drawing Sheets

(52) U.S. Cl.
CPC .............. *F16D 2500/30415* (2013.01); *F16D 2500/30426* (2013.01); *F16H 2061/145* (2013.01); *Y10S 903/914* (2013.01)

(56) References Cited

U.S. PATENT DOCUMENTS

| | | | |
|---|---|---|---|
| 2008/0058154 A1* | 3/2008 | Ashizawa | B60K 6/36 477/5 |
| 2009/0271081 A1* | 10/2009 | Watanabe | F16H 61/08 701/60 |
| 2013/0196820 A1* | 8/2013 | Suzuki | F02D 29/02 477/181 |
| 2016/0325736 A1* | 11/2016 | Lemp | B60W 20/40 |

\* cited by examiner

METHOD AND CONTROL UNIT FOR A MOTOR VEHICLE

FIELD OF THE INVENTION

The invention relates generally to a method for operating a motor vehicle. Moreover, the invention relates generally to a control unit for implementing the method.

BACKGROUND

A motor vehicle includes a prime mover, a transmission, as well as a driven end, wherein the transmission is connected between the prime mover and the driven end. The transmission converts rotational speeds and torques and, in this way, makes the available tractive force of the prime mover available at the driven end. Motor vehicles also include a starting component.

The starting component can be a torque converter including a torque converter lockup clutch or also a master clutch, wherein the master clutch can be a transmission-internal or transmission-external master clutch. The prime mover of the motor vehicle can be an internal combustion engine or an electric machine/motor or also a hybrid drive which includes an internal combustion engine as well as an electric machine/motor.

When the prime mover is a hybrid drive, a separating clutch is typically connected between the internal combustion engine and the electric machine in order to turn off or bring the internal combustion engine to a standstill when the separating clutch is disengaged and to subsequently utilize the electric machine for driving the motor vehicle.

When the torque converter lockup clutch is engaged in a motor vehicle including a torque converter or when the transmission-internal or transmission-external master clutch is engaged in a motor vehicle without a torque converter, and when, in addition, the transmission is friction-locking, i.e., when the prime-mover rotational speed is coupled to the driven-end rotational speed via the transmission ratio, it can become necessary due to an operational event to decouple the rotational speed of the prime mover from the driven-end rotational speed in order to change, in particular, increase the prime-mover rotational speed, decoupled from the driven-end rotational speed.

This can be necessary, for example, when, a motor vehicle including a hybrid drive which is operated purely electrically is situated on an uphill incline, as viewed in the direction of travel, and the power transmission capacity of the torque converter lockup clutch or the power transmission capacity of the launch clutch is too low in order to transmit a torque required for the starting operation in the direction of the driven end. Furthermore, it can also be necessary, for example, to increase the prime-mover rotational speed when a state of charge of an electric accumulator is too low and the electric accumulator is to be charged via the prime mover.

When the torque converter lockup clutch is engaged or the master clutch is engaged and the transmission is friction-locking, if the prime mover is to be decoupled from the driven end, the approach taken in methods for operating a motor vehicle known from practical experience is that the power transmission capacity of the torque converter lockup clutch or the power transmission capacity of the master clutch is reduced by an appropriate reduction of the pressure control thereof. As a result, the torque converter lockup clutch or the master clutch is subsequently brought into a slip operation in order to thereby decouple the prime-mover rotational speed from the driven-end rotational speed and to subsequently preferably increase the prime-mover rotational speed, decoupled from the driven-end rotational speed. Due to the reduction in the power transmission capacity of the torque converter lockup clutch or the master clutch by the corresponding reduction of the pressure control, less torque can be transmitted in the direction of the driven end, and therefore the process of bringing the torque converter lockup clutch or the master clutch into a slip operation is noticeable at the driven end. As a result, when the motor vehicle is located on a hillside, the motor vehicle can be caused to roll backward on the hillside.

DE 10 2006 018 058 A1 describes a motor vehicle including a hybrid drive, a starting component designed as a torque converter, and a transmission. Various starting processes for the motor vehicle are disclosed in this prior art, in which the power transmission capacity of the torque converter lockup clutch is changed in order to transmit a drive torque, without slip, from the torque converter lockup clutch in the direction of the driven end.

DE 10 2015 208 402 A1 describes yet another motor vehicle including a hybrid drive, a starting component designed as a torque converter, and a transmission. In this case, when a decoupling is requested, the torque converter lockup clutch is brought into a state of slip and, when the slip at the torque converter lockup clutch is equal to or greater than a limiting value, a target rotational speed for the electric machine of the prime mover is subsequently specified.

SUMMARY OF THE INVENTION

On the basis thereof, example aspects of the invention create a new type of method for operating a motor vehicle and of creating a control unit for operating a motor vehicle.

According to the invention, the torque converter lockup clutch or the transmission-internal or transmission-external master clutch is brought into a state of slip in that, given a non-reduced pressure control of the torque converter lockup clutch or the master clutch, which determines a power transmission capacity of the torque converter lockup clutch or the master clutch, a target rotational speed or a target torque for the prime mover is specified in such a way that a torque, which is dependent on the target rotational speed, or the target torque is greater than the power transmission capacity of the torque converter lockup clutch or the master clutch and, therefore, slip is built up thereon.

Via the invention, the torque converter lockup clutch or the master clutch is brought into a state of slip in a new way and, in fact, in such a way that the process of bringing the torque converter lockup clutch or the master clutch into a slip operation does not affect the torque transmitted in the direction of the driven end. The process of bringing the torque converter lockup clutch or the master clutch into a slip operation is therefore neutral with respect to wheel torque. This is advantageous not only for reasons of comfort and safety, but also with respect to the vehicle dynamics.

Preferably, the target rotational speed or the target torque for building up the slip at the torque converter lockup clutch or the master clutch is first specified when a difference between a torque transmitted by the torque converter lockup clutch or the master clutch and the simultaneously present power transmission capacity of the torque converter lockup clutch or the master clutch reaches or falls below a limiting value. As a result, the specification of the target rotational speed or the target torque does not result in an increase in the torque transmitted by the torque converter lockup clutch or the master clutch, but rather in the build-up of slip. Therefore, an unexpected acceleration process of the motor vehicle can be avoided.

Preferably, the torque converter lockup clutch or the transmission-internal or transmission-external master clutch is in a condition of micro-slip at the beginning of the method, i.e., immediately before the specification of the target rotational speed or the target torque. A micro-slip is characterized by a very low differential speed of the clutch halves, for example between five and ten revolutions per minute. In such a condition, the prime-mover rotational speed is still coupled to the driven-end rotational speed. Due to such a basic condition, it is ensured that the specification of the target rotational speed or the target torque results in a build-up of slip at the torque converter lockup clutch or the master clutch. Due to the low differential speed, the energy input into the slipping clutch is low.

According to one advantageous refinement of the invention, the pressure control of the torque converter lockup clutch or the master clutch is changed, in a time-controlled and/or event-controlled manner, after the specification of the target rotational speed or the target torque or after the build-up of the slip, in order to subsequently reduce the slip thereof again. Subsequent to the torque converter lockup clutch or the master clutch having been brought into a slip operation, the slip is therefore reduced again, or the micro-slip condition is restored. As a result, the torque converter lockup clutch or master clutch is protected against an overload.

According to one advantageous refinement of the invention, in order to build up slip, a target rotational speed for the prime mover is specified in such a way that the target rotational speed is ramped up and, subsequently, preferably together with a time-controlled and/or event-controlled change in the pressure control, the target rotational speed is further increased depending on a driver demand and/or a control-side specification. The specification of a target rotational speed for the prime mover for the slip build-up at the torque converter lockup clutch or the master clutch is preferred. Via the ramping-up of the target rotational speed for the slip build-up, the slip can be built up at the torque converter lockup clutch or the master clutch in a defined and comfortable manner. Via the subsequent further increase of the target rotational speed, the driver demand or a control-side specification can be taken into account in a comfortable manner.

According to one advantageous refinement of the invention, in order to build up slip before the preferably time-controlled and/or event-controlled change in the pressure control of the torque converter lockup clutch or the master clutch, the pressure control is increased depending on a driver demand and/or a control-side specification. The process of bringing the torque converter lockup clutch or the master clutch into a slip operation can already take place with a load increase in order to take the driver demand or the control-side specification into account in a defined and comfortable manner.

Preferably, the target rotational speed or the target torque is determined depending on a driver demand. This also serves to take the driver demand into account during the process of bringing the clutch into a slip operation and during the subsequent slip reduction.

Preferably, the drive unit includes an internal combustion engine and an electric machine or motor, wherein a power flow between the internal combustion engine and the electric machine is seperable by a controllable separating clutch. The implementation of the target rotational speed or the target torque for building up slip at the torque converter lockup clutch or the master clutch takes place preferably solely by the electric machine, since the actuating accuracy and the actuating speed of the torque by the electric machine is more accurate or greater than that of the internal combustion engine.

BRIEF DESCRIPTION OF THE DRAWINGS

Preferred refinements will become apparent from the dependent claims and the description which follows. Embodiments of the invention are explained in greater detail with reference to the drawings, without being limited thereto. In the drawings:

DETAILED DESCRIPTION

Figure 1:
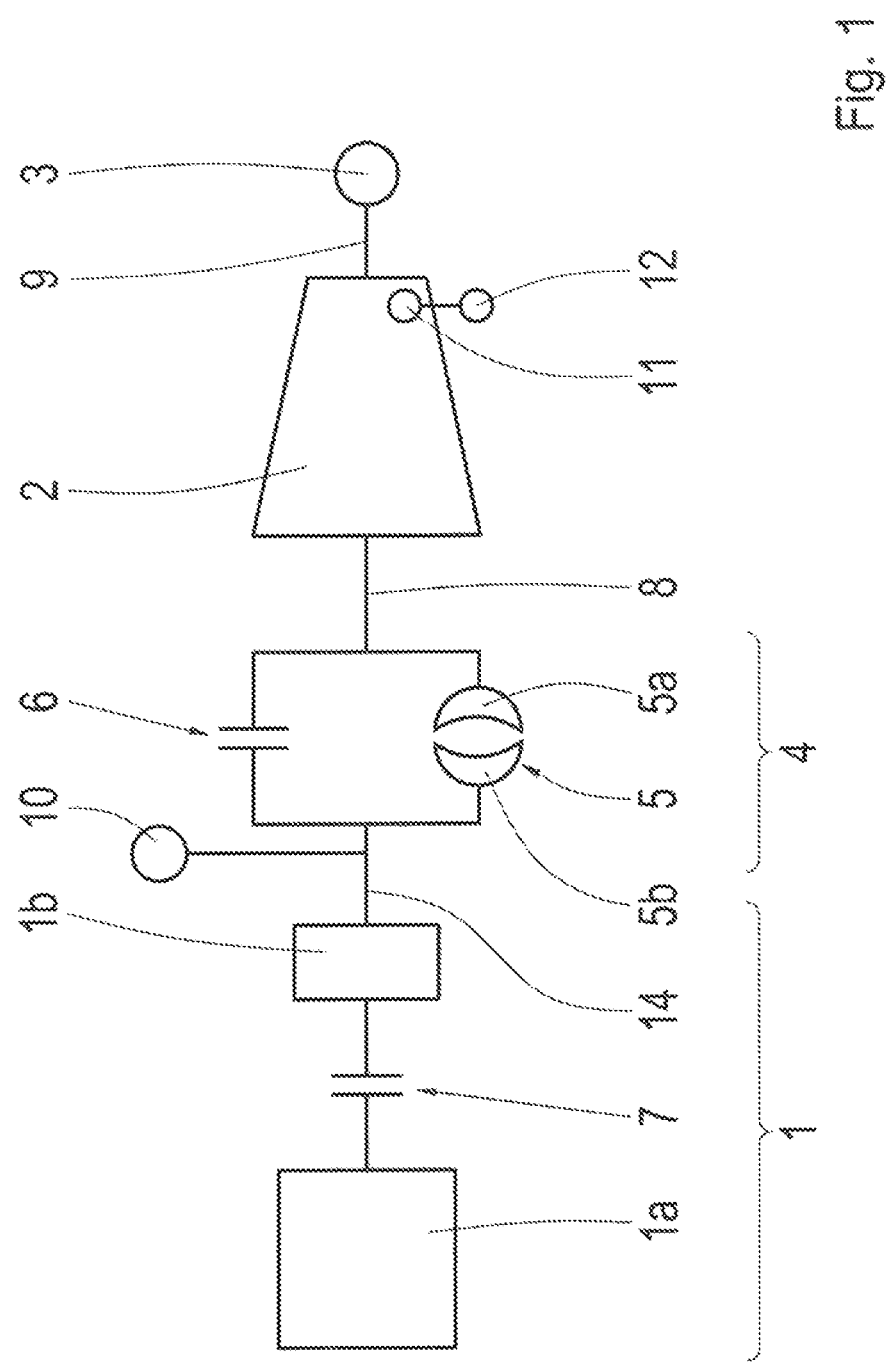
FIG. 1 shows a diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The invention relates generally to a method for operating a motor vehicle and to a control unit for implementing the method.

FIG. 1 shows an exemplary diagram of a drive train of a motor vehicle, in which the method can be utilized.

The motor vehicle in FIG. 1 includes a prime mover 1, a transmission 2, and a driven end 3, wherein the transmission 2 is connected between the prime mover 1 and the driven end.

The transmission 2 is preferably an automatic transmission which makes multiple gears available and which converts rotational speeds and torques depending on the selected gear and, in this way, makes the available tractive force of the prime mover 1 available at the driven end 3.

In the exemplary embodiment shown in FIG. 1, the prime mover 1 is designed as a hybrid drive and includes an internal combustion engine 1*a* and an electric motor or machine 1*b*, wherein a separating clutch 7 is connected between the internal combustion engine 1*a* and the electric machine 1*b*. When the separating clutch 7 is disengaged, the internal combustion engine 1*a* is decoupled and, in the decoupled condition, can be turned off or brought to a standstill.

The motor vehicle in FIG. 1 also includes a starting component 4 which, in FIG. 1, is designed as a torque converter 5 including a torque converter lockup clutch 6. This starting component 4 is connected between the prime mover 1 and the transmission 2. In this case, a turbine wheel 5*a* of the torque converter 5 is coupled to a transmission input shaft 8 of the transmission 2 and an impeller 5*b* of the torque converter 5 is coupled to an input-side shaft 14.

The driven end 3 is coupled to a transmission output shaft 9 of the transmission 2.

FIG. 1 also shows a main pump 10 of a hydraulic supply of the motor vehicle, which is coupled to the input-side shaft 14, wherein this main pump 10 is an oil pump which is mechanically driven by the input shaft 14. The hybrid vehicle shown in FIG. 1, which includes the hybrid drive, includes, in addition to this mechanically driven main pump 10, an electrically driven auxiliary pump 11 which is driven by an electric motor 12.

If such a motor vehicle is operated exclusively via the electric machine 1b, with the internal combustion engine 1a at a standstill, and if the electric machine 1b is at a standstill, for example while the motor vehicle is at a standstill, the mechanically driven main pump 10 cannot maintain an oil supply for the transmission 2, for example. Instead, in this case, the electric auxiliary pump 11 must be driven via the electric motor 12 in order to ensure a supply of hydraulic oil for the transmission 2 and for the torque converter 4.

The invention now relates to a method for operating, for example, a motor vehicle including the drive train in FIG. 1, and, in fact, originating from a condition of the motor vehicle in which, in FIG. 1, the torque converter lockup clutch 6 is engaged, the transmission 2 is friction-locking and, therefore, the prime-mover rotational speed is coupled to the driven-end rotational speed, wherein, in this condition, the transmission 2 transmits a torque made available by the prime mover 1 in the direction of the driven end 3, i.e., the transmission 2 is operated in a friction-locking or torque-transmitting manner. In this condition, the torque converter lockup clutch 6 can also have a micro-slip, i.e., a low differential speed in an exemplary range between five and ten revolutions per minute.

In such a condition, in the motor vehicle in FIG. 1, the torque converter lockup clutch 6 is to be brought into a slip condition when triggered by an event preferably requiring a higher prime-mover rotational speed, in order to thereby decouple the prime-mover rotational speed from the driven-end rotational speed and, with the prime-mover rotational speed decoupled from the driven-end rotational speed, to preferably increase the prime-mover rotational speed.

In a specific case of this type of operating condition of the motor vehicle, the motor vehicle—for example, with the internal combustion engine 1a at a standstill, a disengaged separating clutch 7, a running electric machine 1b, an engaged torque converter lockup clutch 6, and a friction-locking transmission 2—can roll uphill, as viewed in the forward direction of travel, at a low speed, wherein, in this case, the transmission 2 transmits a torque in the direction of the driven end 3. Due to the low speed of the electric machine 1b, the mechanical main pump 10 cannot ensure a sufficient supply of hydraulic oil for the transmission 2 and the torque converter 5 as well as the torque converter lockup clutch 6, and therefore the electric auxiliary pump 11 is driven via the electric motor 12 in order to make a defined oil pressure available, wherein the oil pressure which can be made available by the electric auxiliary pump 11 is limited, whereby a pressure control for the torque converter lockup clutch 6 and for shift elements in the transmission 2 is limited, and therefore their power transmission capacity does not correspond to the maximum possible power transmission capacity, but rather is dependent on the oil pressure made available by the electric auxiliary pump 11 and, therefore, is limited. If the motor vehicle in FIG. 1 is to be accelerated on a hillside, originating from such a condition, it is necessary to increase the oil pressure in order to transmit a higher torque. This is not possible via the electric auxiliary pump 11, however, and therefore the oil pressure must be increased via the mechanical main pump 10. Due to such an event, the prime mover 1 must be decoupled from the driven end 3 in terms of rotational speed in order to increase the rotational speed of the input shaft 14 by increasing the rotational speed of the prime mover 1, namely by increasing the rotational speed of the electric machine 1b in the exemplary embodiment presented above, and, in this way, make a higher oil pressure available via the mechanical main pump 10.

For this purpose, in the exemplary embodiment shown in FIG. 1, the torque converter lockup clutch 6 is brought into a slip operation in that, given a non-reduced pressure control of the torque converter lockup clutch 6 determining the power transmission capacity of the torque converter lockup clutch 6, the torque converter lockup clutch can transmit a non-reduced torque in the direction of the driven end 3, wherein, in this case, a target rotational speed or a target torque is specified for the prime mover 1 in such a way that a torque, which is dependent on the target rotational speed, or the target torque is greater than the power transmission capacity of the torque converter lockup clutch 6, whereby slip is subsequently built up at the torque converter lockup clutch 6.

In this case, when there is slip at the torque converter lockup clutch 6, it is possible to increase the prime-mover rotational speed, decoupled from the driven-end rotational speed and so, in the specific application, to drive the mechanical auxiliary pump 10 in order to increase a supply of oil pressure.

Subsequent to the defined build-up of slip, the pressure control of the torque converter lockup clutch 6 is changed in order to reduce the slip again at the torque converter lockup clutch.

This change in the pressure control of the torque converter lockup clutch 6 in order to reduce the slip at the torque converter lockup clutch subsequent to the previously implemented build-up of slip preferably takes place in a time-controlled and/or event-controlled manner after the specification of the target rotational speed or the target torque and, therefore, in a time-controlled and/or event-controlled manner after the build-up of slip at the torque converter lockup clutch 6.

It can be provided, for example, to measure the rotational speed of the main pump 10 and, when the rotational speed of the main pump 10 reaches a limiting value or becomes greater than the limiting value, subsequently change the pressure control for the torque converter lockup clutch 6 in an event-controlled manner, namely in order to subsequently reduce the slip again at the torque converter lockup clutch. Alternatively thereto, it can be provided to completely disengage the torque converter lockup clutch 6.

In addition, depending on a measured or calculated acceleration of the motor vehicle subsequent to the slip build-up, the pressure control of the torque converter lockup clutch 6 can be changed in an event-controlled manner in order to reduce the slip again at the torque converter lockup clutch.

Alternatively or in addition to such an event-controlled change in the pressure control of the torque converter lockup clutch 6 subsequent to the slip build-up, a time-controlled change in the pressure control of the torque converter lockup clutch 6 can also take place, i.e., after expiration of a defined interval after the build-up of the slip.

Furthermore, the aforementioned event control can be combined with the aforementioned time control, in particular in such a way that a maximum permissible time for the slip must not be exceeded, although depending on an appropriate event, such as the motor vehicle acceleration. After the start of the slip build-up, the change in the pressure control effecting the slip reduction can take place before expiration of this maximum time.

Figure 3:
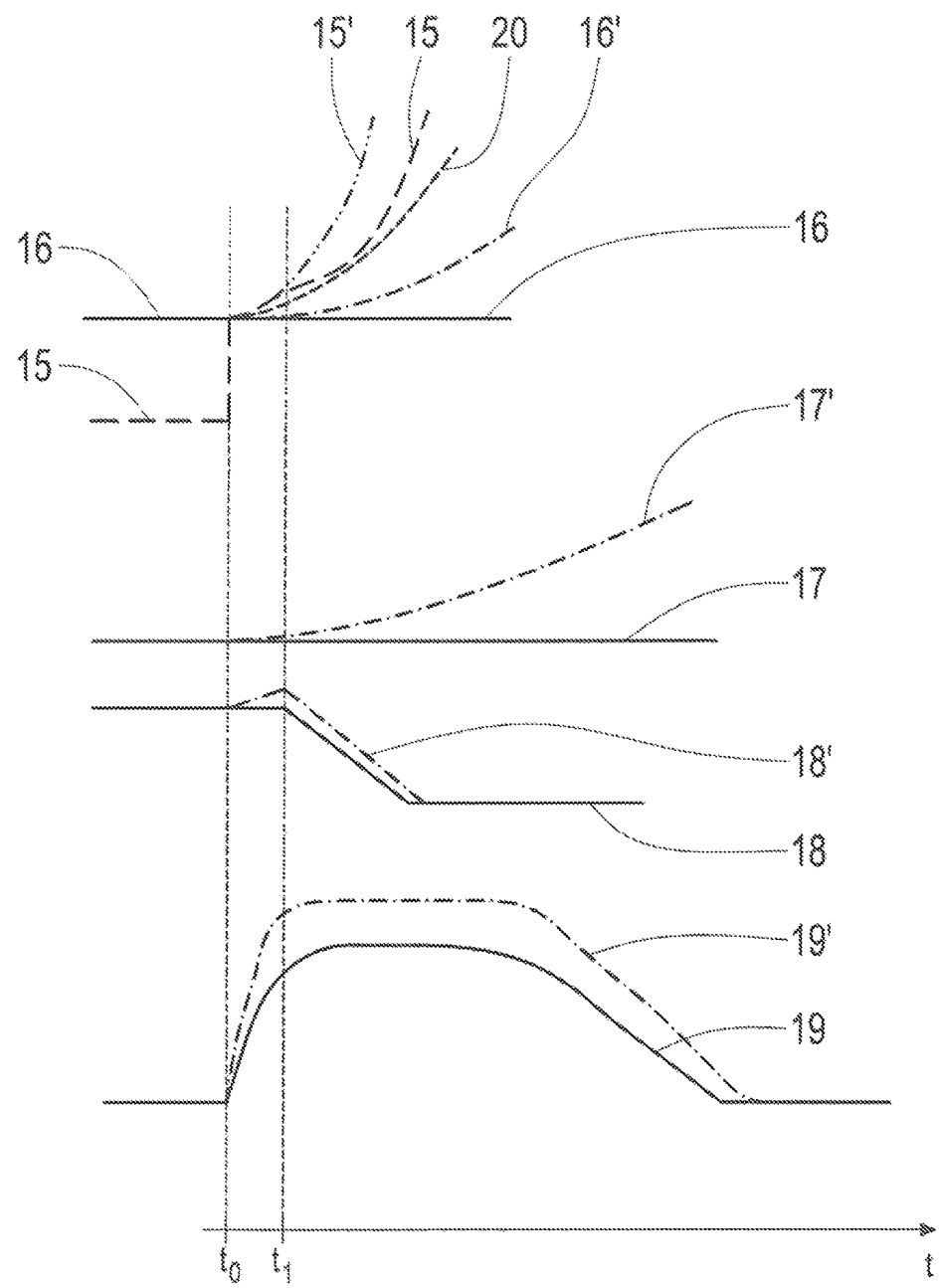
FIG. 3 shows a timing chart for illustrating the invention.

In FIG. 3, several shapes of time curves 15, 16, 17, 18, 19 and 20 over the time t are shown and, in fact, for the case in which the motor vehicle—with the torque converter lockup clutch 6 engaged and given a friction-locking transmission 2—rolls forward, in the direction of travel, uphill at a low speed. An event which requires a higher rotational speed of the prime mover 1 occurs at the point in time t0. In this case, the shape of the curve 15 illustrates a target rotational speed specification for the prime mover 1, namely for the electric machine 1b in FIG. 1, wherein the target rotational speed specification in FIG. 3 before the point in time t0 is zero. The shape of the curve 16 illustrates a rotational speed at the transmission input, i.e., at the transmission input shaft 8. The shape of the curve 17 illustrates a torque made available by the prime mover 1. The shape of the curve 18 illustrates the pressure control for the torque converter lockup clutch 6 and the shape of the curve 19 shows an intervention by the engine controller. The engine controller controls the rotational speed of the prime mover 1 according to the target rotational speed specification by influencing the torque of the prime mover 1. When the target rotational speed increases, the engine controller will therefore specify an additional torque to the prime mover 1 in order to overcome the inertia moment of the prime mover 1 and increase its rotational speed. The shape of the curve 20 shows the actual rotational speed of the prime mover 1, which follows the target rotational speed specification.

At the point in time t0 in FIG. 3, there is an event which requires a higher prime-mover rotational speed. This can be an event, for example, which is triggered by an insufficient state of charge of an electric accumulator or also by a pressure demand for the oil supply system of the motor vehicle, which is to be increased, for example, in order to subsequently travel uphill at a higher speed. Therefore, in FIG. 3 at the point in time t0, the target rotational speed specification 15 is first abruptly initialized to the actual rotational speed of the prime mover 1 in order to be subsequently ramped up.

In this case, solid lines for the shapes of curves 15, 16, 17, 18 and 19 in FIG. 3 each show shapes of curves for the case in which no load increase takes place, i.e., in which the inching speed occurring during inching on a hillside is to remain unchanged. The rotational speed 16 at the transmission input 8 therefore remains unchanged in FIG. 3. The torque made available by the prime mover 1 according to the shape of the curve 17 is increased slightly by the target rotational speed specification 15. When the event requiring the increase in the prime-mover rotational speed occurs at the point in time to, not only is the target rotational speed subsequently ramped up, but also the pressure control for the torque converter lockup clutch 6 remains unchanged for the case without a load increase, according to the shape of the curve 18. The pressure control for the torque converter lockup clutch 6 is therefore not reduced, but rather remains constant for the case without a load increase. The target rotational speed specification 15 brings about the intervention by the engine controller (see the shape of the curve 19). The engine torque, which is dependent on the target rotational speed specification 15, is greater than the torque which can be transmitted by the torque converter lockup clutch 6 as a result of the unchanged pressure control (shape of the curve 18), and therefore slip is built up at the torque converter lockup clutch 6. At the point in time t1, after the slip has been built up, the pressure control (see shape of the curve 18) for the torque converter lockup clutch 6 is changed in a time-controlled or event-controlled manner in order to reduce the slip again at the torque converter lockup clutch.

FIG. 3 shows, with the aid of the shapes of curves 15', 16', 17', 18' and 19', each of which has a dash-dotted line, modifications of the method described above with reference to FIG. 3 for the case of inching on a hillside and, in fact, a modification with a load increase in which, for example, an increase in the inching speed or ground speed of the vehicle is to be implemented preferably depending on the driver demand. For this purpose, the ramping-up of the target rotational speed remains unchanged between the points in time t0 and t1. It is apparent from the shape of the curve 18' that the power transmission capacity of the torque converter lockup clutch 6 is increased at the point in time t0. Furthermore, the engine torque 17' and the target rotational speed specification 15' also increase as compared to the shapes of the curves 17, 19 due, for example, to the driver demand-dependent load increase and, as a result, the intervention 19' by the engine controller in order to keep up with the increased dynamics. In turn, at the point in time t1 when the slip at the torque converter lockup clutch 6 is to be subsequently reduced again, in a time-controlled and/or event-controlled manner, the pressure control for the torque converter lockup clutch 6 is subsequently changed, as is apparent from the shape of the curve 18'. Depending on the driver-input torque, the target rotational speed specification 15' with a load increase and, therefore, also the transmission input rotational speed 16', increase as compared to the shape of the curve 15, however.

It therefore follows from the exemplary embodiment described with reference to FIG. 3 that the target rotational speed for the prime mover 1 is dependent on the driver demand, alternatively or additionally also dependent on the control-side specification. The target rotational speed or the target torque are preferably determined depending on the driver demand and/or a control-side specification.

Figure 2:
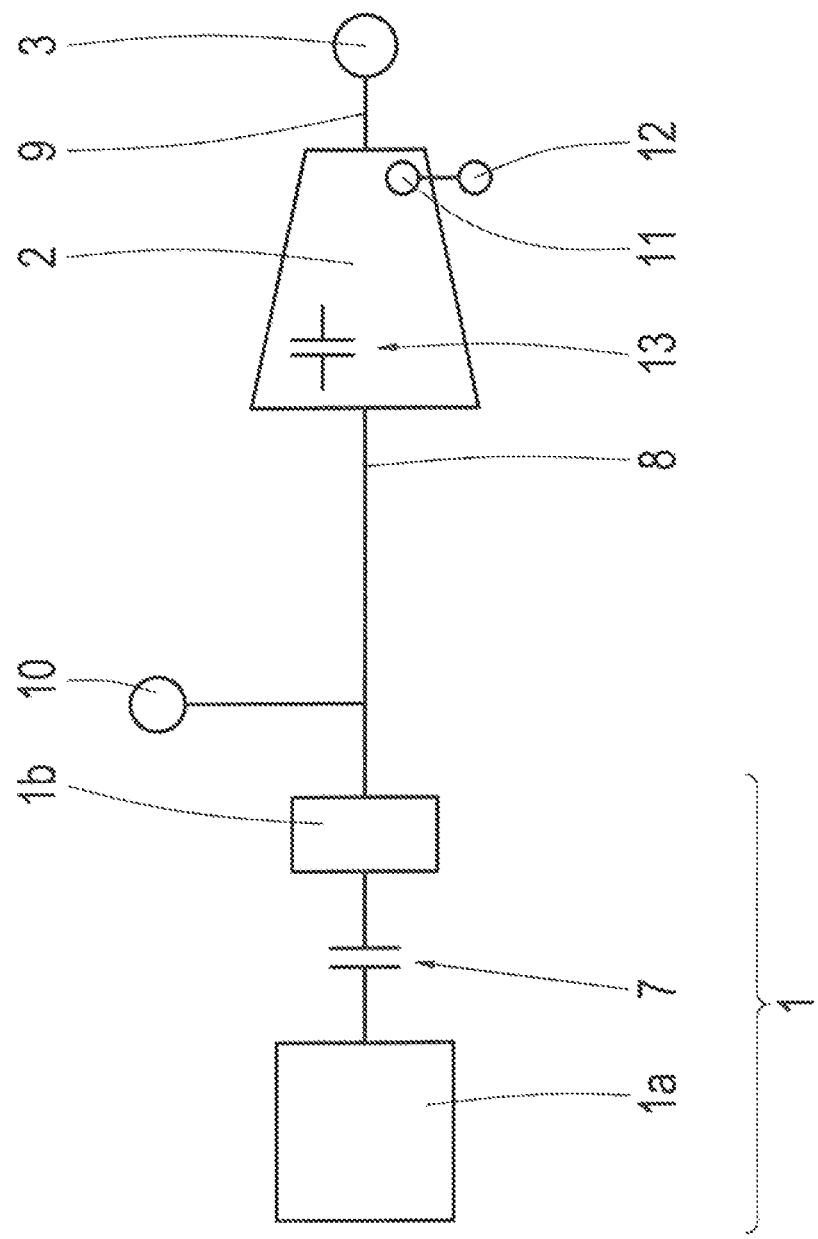
FIG. 2 shows an alternative diagram of a drive train of a motor vehicle.

The invention for a drive train including a starting component 4, which is designed as a torque converter 5 including a torque converter lockup clutch 6, was described with reference to FIGS. 1 and 3. The invention is not limited to such a motor vehicle. Instead, the invention can also be utilized with the motor vehicle shown in FIG. 2, which includes a transmission-internal master clutch 13 as the starting component. For the rest, identical reference characters are utilized for identical assemblies in order to avoid unnecessary repetitions.

It therefore lies within the meaning of the present invention that, when a rotational speed of the prime mover 1, decoupled from the rotational speed of the driven end 3, is to be preferably increased, and given a friction-locking transmission 2 and a force-transmitting starting component, a target rotational speed or a target torque for the prime mover 1 is specified on the control side and, in fact, in such a way that the specified target torque or the torque of the prime mover 1, which is dependent on the target rotational speed, is greater than the power transmission capacity of the starting component, and therefore slip builds up at the starting component, whereby the prime mover 1 is decoupled from the driven end 3 in terms of rotational speed in order to preferably increase the rotational speed of the prime mover 1. Given that the power transmission capacity of the starting component is not reduced, but rather remains at least constant, the increase in the rotational speed of the prime mover 1 can be implemented in a wheel torque-neutral manner. Depending on the driver demand or any other type of control-side event, engine torque can also be additionally built up, namely in order to make a load increase available.

The invention also relates to a control unit for implementing the method according to the invention, wherein the control unit is preferably designed as a transmission control unit and the method is carried out on the control side. For this purpose, the control unit therefore controls the assemblies contributing to the implementation of the method according to the invention via appropriate control signals, for example, valves for the pressure control of the starting component and an engine control unit.

In order to implement the method according to the invention, the control unit according to the invention includes hardware-side and software-side means.

The hardware-side means include data interfaces for exchanging data with assemblies contributing to the implementation of the method according to the invention. The hardware-side means also include a processor for data processing and a memory for data storage. The software-side means include program components for implementing the method according to the invention.

Modifications and variations can be made to the embodiments illustrated or described herein without departing from the scope and spirit of the invention as set forth in the appended claims.

REFERENCE CHARACTERS 1 prime mover
1a internal combustion engine
1b electric machine
2 transmission
3 driven end
4 starting component
5 torque converter
5a turbine wheel
5b impeller
6 torque converter lockup clutch
7 separating clutch
8 transmission input shaft
9 transmission output shaft
10 main pump
11 auxiliary pump
12 electric motor
13 master clutch
14 shaft
15, 15' shape of the curve
16, 16' shape of the curve
17, 17' shape of the curve
18, 18' shape of the curve
19, 19' shape of the curve
20 shape of the curve

The invention claimed is:

1. A method for operating a motor vehicle including a prime mover (1), a driven end (3) and a transmission (2), the transmission (2) connected between the prime mover (1) and the driven end (3), the transmission (2) including a starting component (4), the starting component (4) being either a torque converter (5) with a torque converter lockup clutch (6) or a master clutch (13) that is transmission-internal or transmission-external, the method comprising:

during a condition in which the torque converter lockup clutch (6) or the master clutch (13) is engaged and the transmission (2) is friction-locking such that a rotational speed of the prime-mover (1) is coupled to a rotational speed of the driven-end (3), bringing the torque converter lockup clutch (6) or the master clutch (13) into a slip condition in response to an event requiring an increase in the rotational speed of the prime-mover (1), the rotational speed of the prime-mover (1) decoupled from the rotational speed of the driven-end (3) in the slip condition, the rotational speed of the prime-mover (1) increasing after bringing the torque converter lockup clutch (6) or the master clutch (13) into the slip condition, wherein the torque converter lockup clutch (6) or the master clutch (13) is brought into the slip condition without reducing a pressure control for the torque converter lockup clutch (6) or the master clutch (13), the pressure control determining a power transmission capacity of the torque converter lockup clutch (6) or the master clutch (13), and wherein the torque converter lockup clutch (6) or the master clutch (13) is brought into the slip condition by specifying a target rotational speed or a target torque for the prime mover (1) such that a torque dependent on the target rotational speed or the target torque is greater than the power transmission capacity of the torque converter lockup clutch (6) or the master clutch (13).

2. The method of claim 1, wherein the target rotational speed or the target torque is specified when a difference between a torque transmitted by the torque converter lockup clutch (6) or the master clutch (13) and the simultaneously present power transmission capacity of the torque converter lockup clutch (6) or the master clutch (13) reaches or falls below a limiting value.

3. The method of claim 1, wherein the condition in which the torque converter lockup clutch (6) or the master clutch (13) is engaged and the transmission (2) is friction-locking corresponds to a micro-slip state of the torque converter lockup clutch (6) or the master clutch (13).

4. The method of claim 1, further comprising changing the pressure control of the torque converter lockup clutch (6) or the master clutch (13) in one or more of a time-controlled manner and an event-controlled manner after:
 (1) specifying the target rotational speed or the target torque; or
 (2) the torque converter lockup clutch (6) or the master clutch (13) is brought into the slip condition.

5. The method of claim 4, wherein, in order to bring about the slip condition before the change in the pressure control, the pressure control increases in a manner dependent upon one or more of a driver demand and a control-side specification.

6. The method of claim 1, wherein, in order to bring about the slip condition, the target rotational speed for the prime mover (1) is specified such that the target rotational speed ramps up and subsequently further increases in a manner dependent upon one or more of a driver demand and a control-side specification.

7. The method of claim 6, further comprising changing the pressure control of the torque converter lockup clutch (6) or the master clutch (13) in one or more of a time-controlled manner and an event-controlled manner after:
 (1) specifying the target rotational speed or the target torque; or
 (2) the torque converter lockup clutch (6) or the master clutch (13) is brought into the slip condition,
 wherein the target rotational speed for the prime mover (1) subsequently further increases together with the change in the pressure control.

8. The method of claim 7, wherein, in order to bring about the slip condition before the change in the pressure control, the pressure control increases in the manner dependent upon one or more of the driver demand and the control-side specification.

9. The method of claim 1, wherein the target rotational speed or the target torque is specified depending on a driver demand.

10. The method of claim 1, wherein the prime mover (1) comprises an internal combustion engine (1a) and an electric motor (1b), and a separating clutch 7 is connected between the internal combustion engine (1a) and the electric machine (1b), the method further comprising implementing the target rotational speed or the target torque to bring the torque converter lockup clutch (6) or the master clutch (13) into the slip condition solely with the electric motor (1b).

11. A transmission control unit for a motor vehicle, the transmission control unit programmed to implement the method of claim 1.

12. A transmission control unit for a motor vehicle with a prime mover (1), a driven end (3) and a transmission (2), the transmission (2) connected between the prime mover (1) and the driven end (3), the transmission (2) including a starting component (4), the starting component (4) being either a torque converter (5) with a torque converter lockup clutch (6) or a master clutch (13) that is transmission-internal or transmission-external, the transmission control unit programmed to:

during a condition in which the torque converter lockup clutch (6) or the master clutch (13) is engaged and the transmission (2) is friction-locking such that a rotational speed of the prime-mover (1) is coupled to a rotational speed of the driven-end (3), bring the torque converter lockup clutch (6) or the master clutch (13) into a slip condition on a control side in response to an event requiring an increase in the rotational speed of the prime-mover (1), the rotational speed of the prime-mover (1) decoupled from the rotational speed of the driven-end (3) in the slip condition on the control side, the rotational speed of the prime-mover (1) increasing after bringing the torque converter lockup clutch (6) or the master clutch (13) into the slip condition;

bring the torque converter lockup clutch (6) or the master clutch (13) into the slip condition on the control side without reducing a pressure control for the torque converter lockup clutch (6) or the master clutch (13), the pressure control determining a power transmission capacity of the torque converter lockup clutch (6) or the master clutch (13); and bring the torque converter lockup clutch (6) or the master clutch (13) into the slip condition on the control side by specifying a target rotational speed or a target torque for the prime mover (1) such that a torque dependent on the target rotational speed or the target torque is greater than the power transmission capacity of the torque converter lockup clutch (6) or the master clutch (13).

* * * * *